United States Patent
Kikuchi et al.

(10) Patent No.: US 8,004,130 B2
(45) Date of Patent: Aug. 23, 2011

(54) ROTATING ELECTRIC MACHINE AND MANUFACTURING METHOD THEREFOR

(75) Inventors: Masao Kikuchi, Tokyo (JP); Yoshinobu Utsumi, Tokyo (JP); Hitoshi Isoda, Tokyo (JP); Yuji Shirakata, Tokyo (JP); Masahiko Fujita, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 386 days.

(21) Appl. No.: 12/357,165

(22) Filed: Jan. 21, 2009

(65) Prior Publication Data
US 2010/0097053 A1    Apr. 22, 2010

(30) Foreign Application Priority Data
Oct. 22, 2008 (JP) ................... 2008-272278

(51) Int. Cl.
- *H02K 5/16* (2006.01)
- *H02K 7/08* (2006.01)
- *H02K 11/00* (2006.01)

(52) U.S. Cl. .......... 310/68 C; 310/68 B; 310/68 D; 310/90

(58) Field of Classification Search ........... 310/64, 310/68 C, 68 D, 68 B, 90; 324/207.25; 290/40 C
See application file for complete search history.

(56) References Cited

U.S. PATENT DOCUMENTS

| | | | | |
|---|---|---|---|---|
| 5,001,412 A * | 3/1991 | Carter et al. | ...... | 322/10 |
| 6,573,631 B2 * | 6/2003 | Asao et al. | ...... | 310/214 |
| 7,208,918 B2 * | 4/2007 | Shirakawa et al. | ...... | 322/99 |
| 7,508,087 B2 * | 3/2009 | Tsujimoto et al. | ...... | 290/40 C |
| 7,619,338 B2 * | 11/2009 | Hamada | ...... | 310/89 |
| 7,633,197 B2 * | 12/2009 | Isoda et al. | ...... | 310/68 C |
| 2002/0043885 A1 * | 4/2002 | Asao et al. | ...... | 310/90 |
| 2008/0225565 A1 * | 9/2008 | Tsujimoto et al. | ...... | 363/127 |
| 2008/0252160 A1 * | 10/2008 | Kavalsky et al. | ...... | 310/71 |

FOREIGN PATENT DOCUMENTS

| | | |
|---|---|---|
| JP | 4-34618 U | 3/1992 |
| JP | 11-027903 A | 1/1999 |
| JP | 2003-294488 A | 10/2003 |
| JP | 2006-317284 A | 11/2006 |
| JP | 2007-060734 A | 3/2007 |

* cited by examiner

*Primary Examiner* — Paul Ip
(74) *Attorney, Agent, or Firm* — Sughrue Mion, PLLC

(57) ABSTRACT

There is provided a rotating electric machine including a rotation sensor unit capable of demonstrating a shielding effect over a wide frequency bandwidth and a manufacturing method therefor. In the rotating electric machine, a power unit provided with a switching element that controls an electric current that flows in a stator winding and a magnetic-field current control circuit unit provided with a switching element that controls an electric current that flows in a rotor winding are arranged on a predetermined surface of one of a pair of brackets that pivotably support a rotor shaft, and the rotation sensor unit is disposed in the vicinity of the predetermined surface of the one bracket; The rotating electric machine is characterized in such a way that there is provided a ring-shaped member that is fixed on the outer surface of the rotation sensor unit, and the ring-shaped member is configured with a non-magnetic unit having an electric conductivity and a magnetic unit.

7 Claims, 6 Drawing Sheets

ROTATING ELECTRIC MACHINE AND MANUFACTURING METHOD THEREFOR

BACKGROUND OF THE INVENTION

1. Field of the Invention

The present invention relates to a rotating electric machine such as a motor and a manufacturing method therefor, and more particularly to a rotating electric machine that can be installed in a relatively small space such as a place in a vehicle and to a manufacturing method therefor.

2. Description of the Related Art

To date, there has been well known a controller-integrated rotating electric machine in which a control circuit unit that controls a stator current or the like and a rotation-position detection unit that detects the rotation position of a rotor are integrated. The control of the output of such a rotating electric machine is performed by switching-controlling switching elements in an inverter circuit incorporated in the control circuit unit so as to control electric currents that flow in the windings of the rotating electric machine. In other words, the electric currents that flow in the windings of the rotating electric machine are controlled by controlling the ratio of on duration to off duration (duty ratio) of each switching element so that the output of the rotating electric machine is controlled.

In the switching operation of the switching element, when the switching element is turned off, an electric current that has flown till then is instantaneously cut off, whereby a rapid and abrupt change in the current is caused; thus, a change in the magnetic field around the current path is produced in such a way that the current change is cancelled. The change in the magnetic field appears as electromagnetic noise in other apparatuses and circuits, whereby an erroneous operation may be caused.

In particular, in a controller-integrated rotating electric machine, a control circuit unit provided with an inverter circuit including switching elements and a rotation-position detection unit that detects the rotation position of the rotor are arranged in the vicinity of each other; therefore, a change in the magnetic field caused by the rapid and abrupt change in an electric current reaches the region where the rotation-position detection unit is located, whereby the operation of the rotation-position detection unit may adversely be affected.

Accordingly, to date, with regard to a controller-integrated rotating electric machine, there have been proposed technologies in which, in order to shield the rotation-position detection unit from the external magnetic field, the periphery of the rotation-position detection unit is covered with a shielding member (e.g., refer to Japanese Patent Laid-Open No. 2007-60734).

In a conventional rotating electric machine disclosed in Japanese Patent Laid-Open No. 2007-60734, almost all of the magnetic field produced outside the rotation-position detection unit is shut off by the shielding member; therefore, the level of noise superimposed in the output of the rotation-position detection unit lowers, whereby it is made possible to prevent the rotation-position detection unit from erroneously operating.

However, in the conventional rotating electric machine disclosed in Japanese Patent Laid-Open No. 2007-60734, when there occurs a deviation, i.e., a so-called positional deviation of the shielding member, formed of a magnetic material, from its original installation position, variations are produced in a magnetic field formed of the shield member and the magnetic portions, of the stator and the rotor, which configure the rotation-position detection unit; as a result, there has been anxieties of the occurrence of variations in the performances of rotating electric machines, deterioration of the shielding effect against noise, and the like.

Materials that effectively functions as magnetic units are mechanically fragile by nature; therefore, depending on the positioning method for maintaining the shielding member formed of such a material at a predetermined position, the magnetic unit may undergo mechanical deterioration such as breakage. Accordingly, there has been desired the provision of a method or a means for fixing the shielding member at a predetermined position, without applying excessive mechanical stress to the magnetic unit that forms the shielding member.

Moreover, in the case of the conventional rotating electric machine configured as described above, it is required to provide an opening in the shielding member that covers the periphery of the rotation-position detection unit and to dispose a signal line through which transmission and reception of an electric signal is performed between the rotation-position detection unit and an external apparatus, in order to control the operation of the rotating electric machine by use of rotation-position information, which is the output of the rotation-position detection unit; however, there has been an anxiety that external magnetic flux intrudes into the inside of the shielding member through the opening, in the shielding member, through which the signal line passes, whereby the shielding performance is deteriorated.

SUMMARY OF THE INVENTION

The present invention has been implemented in order to solve the foregoing problems in the conventional rotating electric machine; the objective thereof is to provide a rotating electric machine including a rotation sensor unit capable of demonstrating a shielding effect and a manufacturing method therefor.

A rotating electric machine according to the present invention includes a power unit provided with a switching element that controls an electric current that flows in a stator winding provided in a stator, a magnetic-field current control circuit unit provided with a switching element that controls an electric current that flows in a rotor winding provided in a rotor, and a rotation sensor unit including a sensor rotor fixed on a rotor shaft that supports the rotor, a sensor stator that faces the sensor rotor by the intermediary of a gap, and a sensor winding provided on the sensor stator; the rotation sensor unit outputs from the sensor winding an output in accordance with a rotation position of the sensor rotor. The rotating electric machine according to the present invention is characterized in that the power unit and the magnetic-field current control circuit unit are arranged on a predetermined surface of one of a pair of brackets that pivotably support the rotor shaft, and the rotation sensor unit is disposed in the vicinity of the predetermined surface of the one bracket; and there is provided a ring-shaped member that is fixed on the outer surface of the rotation sensor unit, and the ring-shaped member is configured with a non-magnetic unit having an electric conductivity and a magnetic unit.

A production method, according to the present invention, for a rotating electric machine is characterized in that, after the rotation sensor unit and the ring-shaped member are preliminarily fixed to each other, the rotation sensor unit is provided in the rotating electric machine.

In the electric rotating machine according to the present invention, a sharp change, in a magnetic field, that is caused by the switching operation of the switching element and reaches the rotation sensor unit can be reduced by an eddy current produced on the surface of the non-magnetic unit, having an electric conductivity, of the ring-shaped member and through the formation of a magnetic circuit; therefore, noise produced in the output of the rotation sensor unit can be reduced, whereby not only an erroneous operation can be prevented, but also the output of the electric rotating machine can be controlled with high accuracy. Moreover, by utilizing a non-magnetic unit having a high mechanical strength, the rotation sensor unit can be held and a positioning mechanism therefor can be provided; therefore, the accuracy of detection by the rotation sensor unit can be enhanced, whereby the output of the electric rotating machine can be controlled with further high accuracy.

In a production method for an electric rotating machine, according to the present invention, after the rotation sensor unit and the ring-shaped member are preliminarily fixed to each other, the rotation sensor unit is provided in the rotating electric machine; thus, the centering between the ring-shaped member and the rotation sensor unit can readily be performed. Moreover, demand for many types of rotating electric machines can be dealt with by manufacturing rotation sensor units provided with the same ring-shaped member; therefore, the productivity can be enhanced.

The foregoing and other object, features, aspects, and advantages of the present invention will become more apparent from the following detailed description of the present invention when taken in conjunction with the accompanying drawings.

DETAILED DESCRIPTION OF THE PREFERRED EMBODIMENTS

Embodiment 1

Figure 1:
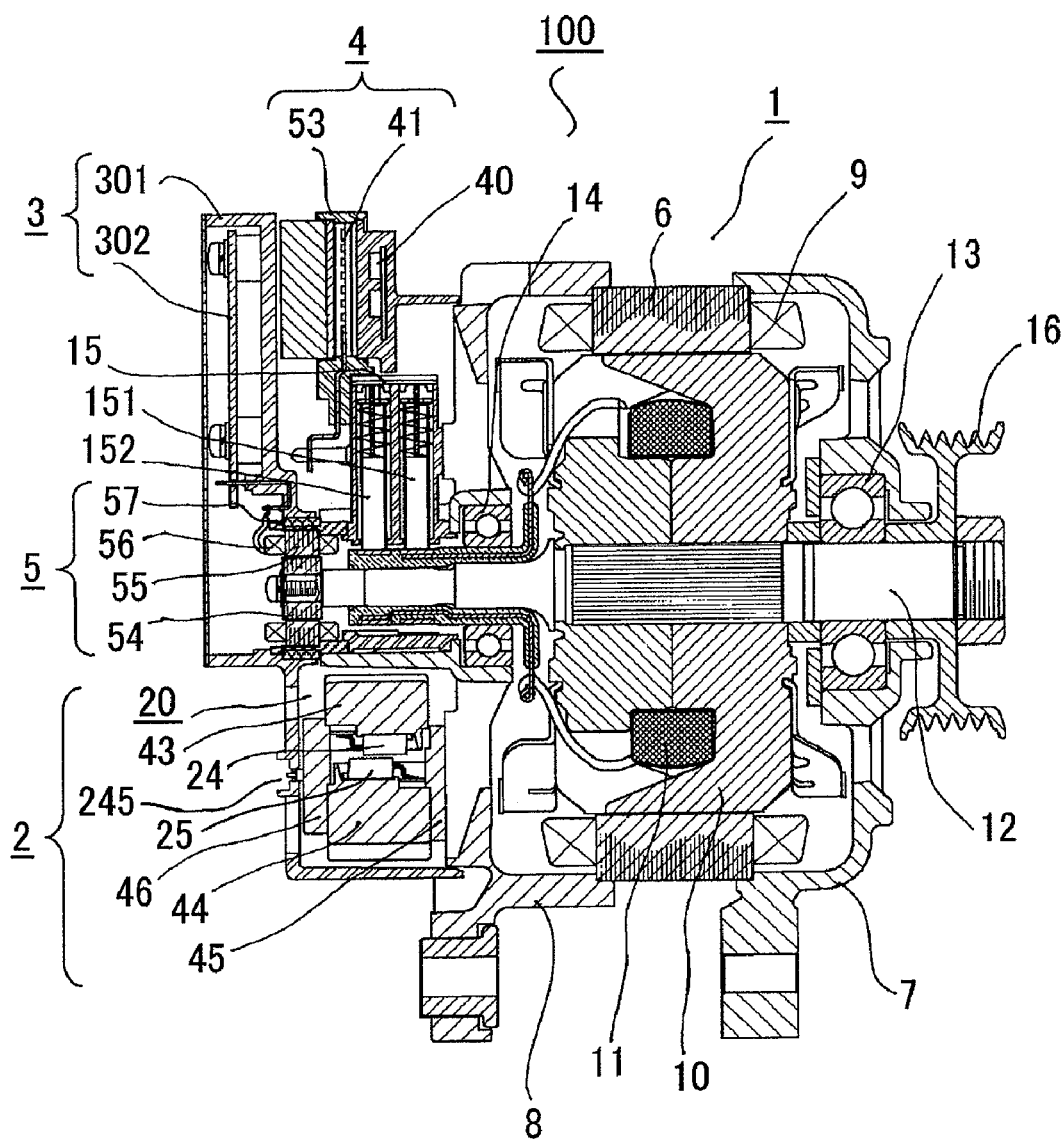
FIG. 1 is a cross-sectional view of a rotating electric machine according to Embodiment 1 of the present invention.
Figure 2:
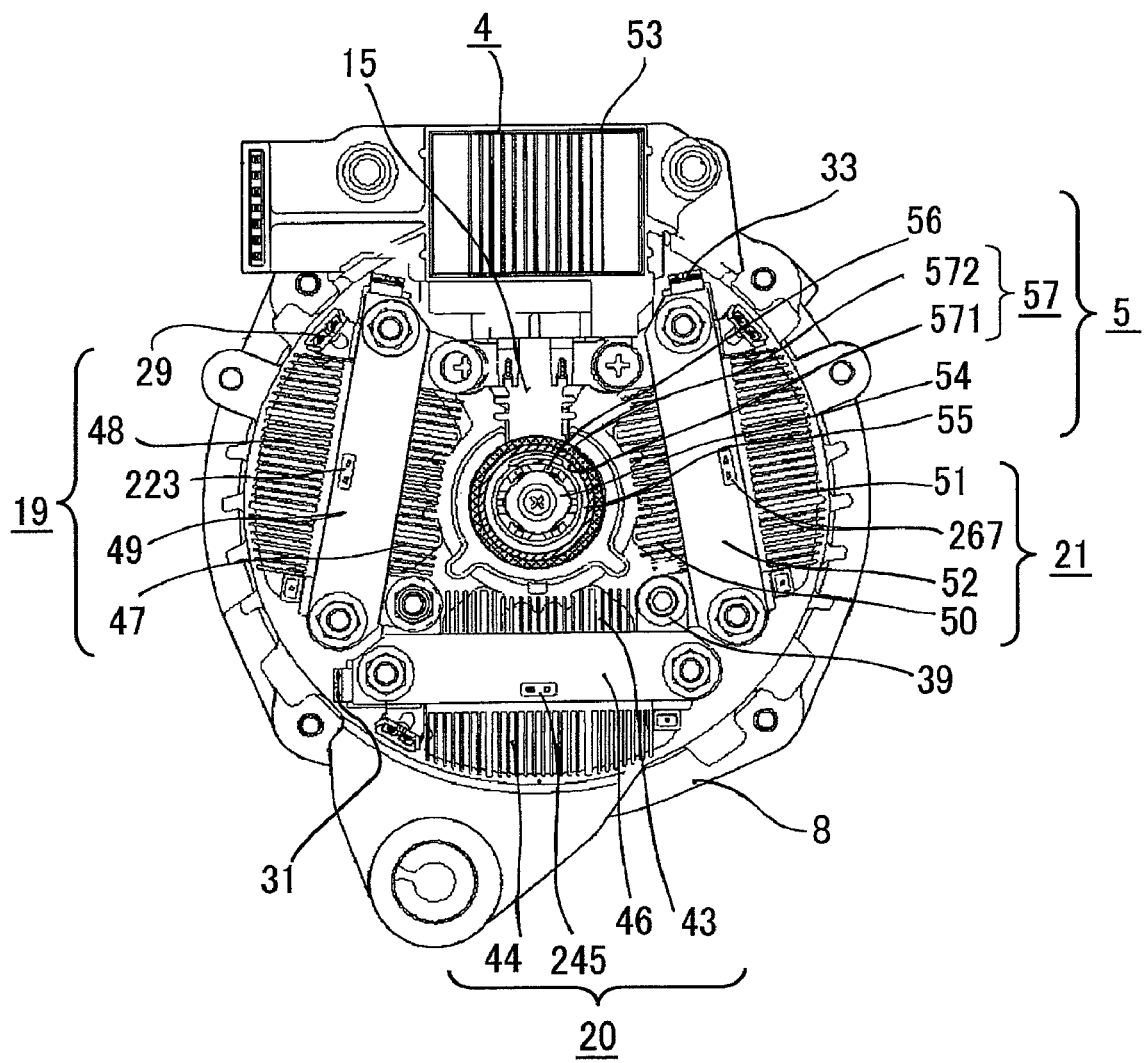
FIG. 2 is a plan view illustrating a power unit and a magnetic-field current control circuit unit mounted on a rear bracket of a rotating electric machine according to Embodiment 1 of the present invention.
Figure 3:
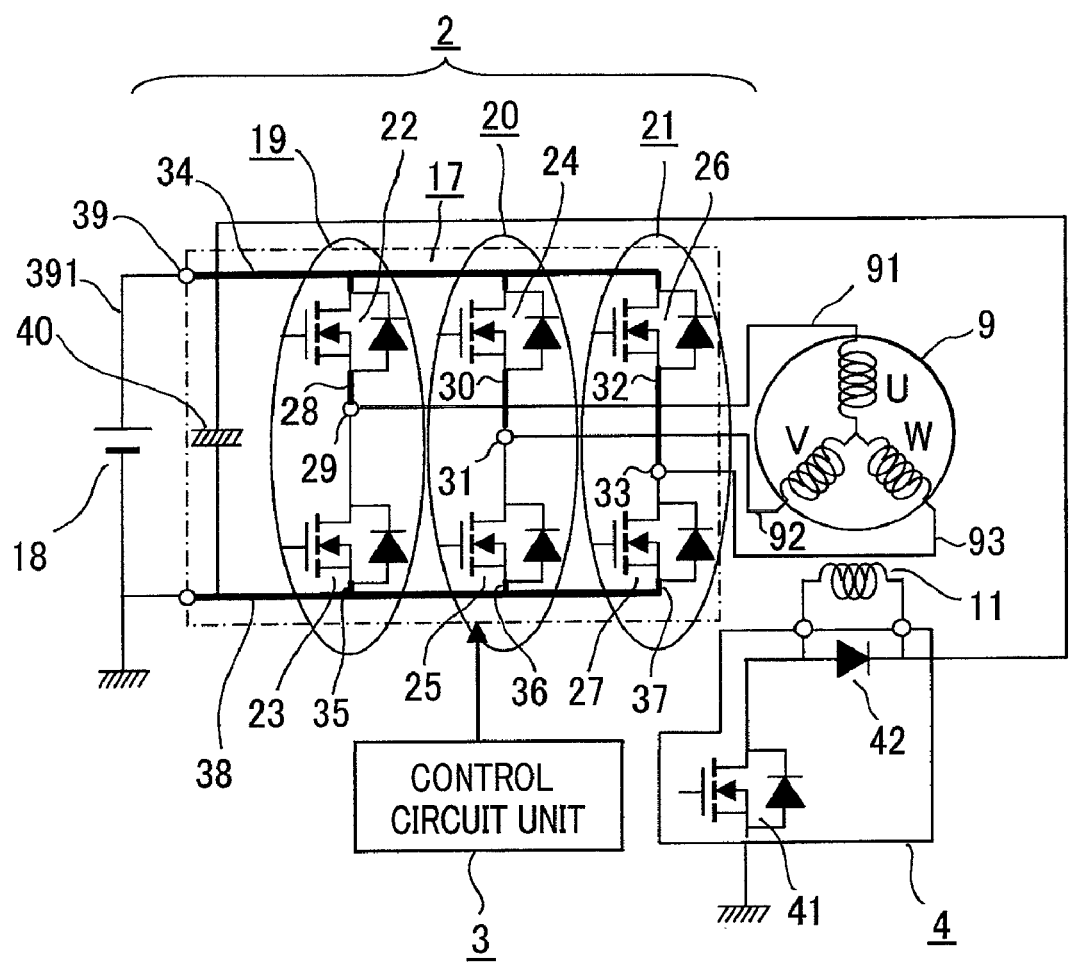
FIG. 3 is a circuit diagram of a rotating electric machine according to Embodiment 1 of the present invention.

A rotating electric machine according to Embodiment 1 of the present invention will be explained with reference to the accompanying drawings. A rotating electric machine according to Embodiment 1 of the present invention is configured as a controller-integrated rotating electric machine and referred to as a controller-integrated rotating electric machine. FIG. 1 is a cross-sectional view of a rotating electric machine according to Embodiment 1 of the present invention; FIG. 2 is a plan view illustrating a power unit and a magnetic-field current control circuit unit mounted on a rear bracket of a rotating electric machine according to Embodiment 1 of the present invention; FIG. 3 is a circuit diagram of a rotating electric machine according to Embodiment 1 of the present invention.

In FIG. 1, a controller-integrated rotating electric machine 100 is configured with a rotating electric machine unit 1, a power unit 2, a control circuit unit 3, a magnetic-field current control circuit unit 4, and a rotation sensor unit 5, when roughly divided.

A rotating electric machine unit 1 is provided with a stator iron core 6 cylindrically formed of laminated magnetic thin plates; a front bracket 7 and a rear bracket 8 that are arranged in such a way as to flank the stator iron core 6 in the axis direction thereof and support the stator iron core 6; a stator winding 9, as an armature winding, that is mounted in a slot (unillustrated) of the stator iron core 6; a claw-pole rotor iron core 10 that is inserted into the hollow portion of the stator iron core 6 and whose outer circumference faces the inner circumference of the stator iron core 6 through a predetermined gap; and a rotor winding 11, as a magnetic-field winding, that is fixed to the rotor iron core 10. The stator iron core 6 and the stator winding 9 configure the stator of the rotating electric machine unit 1; the rotor iron core 10 and the rotor winding 11 configure the rotor of the rotating electric machine unit 1.

The rotating electric machine unit 1 is provided with a rotor shaft 12 that penetrates the shaft portion of the rotor iron core 10 and is fixed to the rotor iron core 10. The rotor shaft 12 is pivotably supported by the front bracket 7 and the rear bracket 8 through bearings 13 and 14, respectively. A brush holder 15 provided on the outer surface of the rear bracket 8 has a pair of brushes 151 and 152 that make contact with a pair of slip rings provided on the rotor shaft 12. A pulley 16 is fixed to an axis-direction end of the rotor shaft 12 in such a way as to be in the vicinity of the outer surface of the front bracket 7 and is coupled with a load, e.g., with the engine of an vehicle or the like, through an unillustrated belt.

The controller-integrated rotating electric machine 100 has a circuit configuration illustrated in FIG. 3. In other words, in FIG. 3, the stator winding 9 that forms the armature winding of the rotating electric machine unit 1 is configured with windings, for three phases U, V, and W, in which electric currents whose phases are shifted by an electric angle of 120° from one another flow, and connected with a battery 18 mounted in a vehicle, through an electric-power conversion circuit 17. The electric-power conversion circuit 17 is formed of a three-phase bridge circuit including a U-phase switching circuit unit 19, a V-phase switching circuit unit 20, and a W-phase switching circuit unit 21, and performs electric power conversion between the battery 18 and the stator winding 9.

The U-phase switching circuit unit 19 is provided with a switching element 22 that forms a U-phase positive-polarity arm of the electric-power conversion circuit 17 and a switching element 23 that forms a U-phase negative-polarity arm of the electric-power conversion circuit 17. The V-phase switching circuit unit 20 is provided with a switching element 24 that forms a V-phase positive-polarity arm of the electric-power conversion circuit 17 and a switching element 25 that forms a V-phase negative-polarity arm of the electric-power conversion circuit 17. The W-phase switching circuit unit 21 is provided with a switching element 26 that forms a W-phase positive-polarity arm of the electric-power conversion circuit 17 and a switching element 27 that forms a W-phase negative-polarity arm of the electric-power conversion circuit 17.

Each of the foregoing switching elements 22, 23, 24, 25, 26, and 27 is a semiconductor device, e.g., such as an IGBT (Integrated Gate Bipolar Transistor) or a MOSFET (Metal-Oxide Semiconductor Field Effect Transistor), and is formed of Si or SiC.

A pair of switching elements 22 and 23 in the U-phase switching circuit unit 19 are connected with each other via a wiring lead 28, and a terminal 29 provided on the wiring lead 28 is connected with a U-phase terminal 91 of the stator winding 9. The switching elements 24 and 25 in the V-phase switching circuit unit 20 are connected with each other via a wiring lead 30, and a terminal 31 provided on the wiring lead 30 is connected with a V-phase terminal 92 of the stator winding 9. The switching elements 26 and 27 in the W-phase switching circuit unit 21 are connected with each other via a wiring lead 32, and a terminal 33 provided on the wiring lead 32 is connected with a W-phase terminal 93 of the stator winding 9.

The positive-polarity sides of the switching elements 22, 24, and 26 that form the respective positive-polarity arms of the switching circuit units 19, 20, and 21 are connected to one another by means of a wiring lead 34; the negative-polarity sides of the switching elements 23, 25, and 27 that form the respective negative-polarity arms are connected to one another by means of a wiring lead 38, via wiring leads 35, 36, and 37, respectively. A battery terminal 39 connected to the wiring lead 34 is connected with the positive-polarity electrode of the battery 18 via a harness 391. The wiring lead 38 is connected with the negative-polarity electrode of the battery 18. A capacitor 40 that smoothes ripple components of a direct current in the electric-power conversion circuit 17 is connected between the wiring leads 34 and 38.

The energizing current as a magnetic-field current in the rotor winding 11 that forms the magnetic-field winding of the rotating electric machine unit 1 is controlled through the switching operation of a magnetic-field switching element 41 connected between the battery 18 and the rotor winding 11. The magnetic-field switching element 41 is a semiconductor device, e.g., such as an IGBT (Integrated Gate Bipolar Transistor) or a MOSFET (Metal-Oxide Semiconductor Field Effect Transistor), and is formed of Si or SiC. A reverse-current prevention diode 42 is connected across the rotor winding 11.

The switching elements 22 to 27, the wiring leads 28, 30, 32, 35, 36, and 37 in the electric-power conversion circuit 17 configure the power unit 2, as described later; the magnetic-field switching element 41 and the reverse-current prevention diode 42 configure the magnetic-field current control circuit unit 4, as described later.

In the case where the rotating electric machine unit 1 is operated as a motor, the switching elements 22 to 27 are switching-controlled based on a control signal from a control circuit unit 3 so that the electric-power conversion circuit 17 is operated as an inverter, whereby DC power supplied by the battery 18 is converted into three-phase AC power and then supplied to the stator winding 9. Additionally, the magnetic-field switching element 41 of the magnetic-field current control circuit unit 4 is switching-controlled based on a control signal from the control circuit unit 3, so that the battery 18 supplies the rotor winding 11 with an electric current.

At this time, the switching elements 22 to 27 of the electric-power conversion circuit 17 and the magnetic-field switching element 41 of the magnetic-field current control circuit unit 4 are on/off-controlled with appropriate duty ratios, based on the control signals from the control circuit unit 3, so that the current that flows in the stator winding 9 and the current that flows in the rotor winding 11 are controlled. By controlling the current that flows in the stator winding 9, the output torque can be adjusted in the case where the rotating electric machine unit 1 is operated as a motor.

In contrast, in the case where the rotating electric machine unit 1 is operated as an electric power generator, the magnetic-field switching element 41 of the magnetic-field current control circuit unit 4 is switching-controlled based on the control signal from the control circuit unit 3 so that the battery 18 supplies the rotor winding 11 with an electric current, and the switching elements 22 to 27 are switching-controlled based on the control signal from a control circuit unit 3 so that the electric-power conversion circuit 17 is operated as a converter, whereby three-phase AC power generated in the stator winding 9 is converted into DC power so that the battery 18 is charged with the DC power.

At this time, the switching elements 22 to 27 of the electric-power conversion circuit 17 and the magnetic-field switching element 41 of the magnetic-field current control circuit unit 4 are on/off-controlled with appropriate duty ratios, based on the control signals from the control circuit unit 3, so that the current that flows in the stator winding 9 and the current that flows in the rotor winding 11 are controlled. The switching elements 22 to 27 are turned on in synchronization with the generated current and currents flow in the wiring leads having a low resistance; therefore, high-efficiency power generation can be performed. Additionally, by controlling the current that flows in the rotor winding 11, the generated power can be adjusted in the case where the rotating electric machine unit 1 is operated as an electric power generator.

Next, the configuration of the power unit 2 will be explained. As illustrated in FIG. 2, the power unit 2 is configured with a U-phase switching circuit unit 19, V-phase switching circuit unit 20, and W-phase switching circuit unit 21; the switching circuit units 19, 20, and 21 are arranged at and fixed to respective predetermined positions on the outer surface of the rear bracket 8. In other words, the switching circuit units 19, 20, and 21 for the respective phases are arranged in such a way as to surround the rotation sensor unit 5 provided at the middle of the rear bracket 8 and are fixed to the outer surface of the rear bracket 8. The switching circuit units 19, 20, and 21, for the respective phases, that configure the power unit 2 illustrated in FIG. 2 correspond to the switching circuit units 19, 20, and 21 for the respective phases in the electric-power conversion circuit 17 illustrated in FIG. 3 described above.

In FIG. 1, there is illustrated the cross-sectional view of the v-phase switching circuit unit 20 among the switching circuit units 19, 20, and 21, for the respective phases, that configure the power unit 2. In FIG. 1, the V-phase switching circuit unit 20 is provided with the switching element 24 that forms the V-phase positive-polarity arm and the switching element 25 that forms the V-phase negative-polarity arm. The switching element 24 is fixed on a positive-polarity heat sink 43, and the positive-polarity side thereof is electrically connected to the positive-polarity heat sink 43. The switching element 25 is fixed on a negative-polarity heat sink 44, and the negative-polarity side thereof is electrically connected to the negative-polarity heat sink 44. The negative-polarity heat sink 44 is electrically connected to the rear bracket 8 via an electric conductor 45. The positive-polarity heat sink 43 and the negative-polarity heat sink 44 refrigerate the switching elements 24 and 25, respectively, that are fixed thereto, and are utilized as current paths, as described later.

As illustrated in FIG. 2, an electric conductor 46 is provided at a position that is more distal from the rear bracket 8 than the heat sinks 43 and 44. The electric conductor 46 electrically connects the negative-polarity side of the switching element 24 with the positive-polarity side of the switching element 25 and is provided with the terminal 31 that is connected with the V-phase terminal 92 of the stator winding 9. Additionally, a control terminal 245 that is connected to the control circuit unit 3 is provided in the electric conductor 46; the control signal from the control circuit unit 3 is supplied to the gates of the switching elements 24 and 25 via the control terminal 245. The electric conductor 46 illustrated in FIGS. 1 and 2 forms the wiring lead 30 illustrated in FIG. 3. The terminal 31 in FIG. 2 corresponds to the terminal 31 illustrated in FIG. 3.

The U-phase switching circuit unit 19 is provided with a switching element 22 (refer to FIG. 3) that forms the U-phase positive-polarity arm and the switching element 23 (refer to FIG. 3) that forms the U-phase negative-polarity arm. The switching element 21 that forms the U-phase positive-polarity arm is fixed on a positive-polarity heat sink 47, and the positive-polarity side of the switching element 22 is electrically connected to the positive-polarity heat sink 47. The switching element 23 that forms the U-phase negative-polarity arm is fixed on a negative-polarity heat sink 48, and the negative-polarity side of the switching element 23 is electrically connected to the negative-polarity heat sink 48. The negative-polarity heat sink 48 is electrically connected to the rear bracket 8 via an electric conductor (unillustrated). The positive-polarity heat sink 47 and the negative-polarity heat sink 48 refrigerate the switching elements 22 and 23, respectively, that are fixed thereto, and are utilized as current paths, as described later.

An electric conductor 49 is provided at a position that is more distal from the rear bracket 8 than the heat sinks 47 and 48. The electric conductor 49 electrically connects the negative-polarity side of the switching element 22 with the positive-polarity side of the switching element 23 and is provided with the terminal 29 that is connected with the U-phase terminal 91 of the stator winding 9. Additionally, a control terminal 223 that is connected to the control circuit unit 3 is provided in the electric conductor 49; the control signal from the control circuit unit 3 is supplied to the gates of the switching elements 22 and 23 via the control terminal 223. The electric conductor 49 illustrated in FIG. 2 forms the wiring lead 28 illustrated in FIG. 3. The terminal 29 in FIG. 2 corresponds to the terminal 29 illustrated in FIG. 3.

The W-phase switching circuit unit 21 is provided with the switching element 26 (refer to FIG. 3) that forms the W-phase positive-polarity arm and the switching element 27 (refer to FIG. 3) that forms the W-phase negative-polarity arm. The switching element 26 that forms the W-phase positive-polarity arm is fixed on a positive-polarity heat sink 50, and the positive-polarity side of the switching element 26 is electrically connected to the positive-polarity heat sink 50. The switching element 27 that forms the U-phase negative-polarity arm is fixed on a negative-polarity heat sink 51, and the negative-polarity side of the switching element 27 is electrically connected to the negative-polarity heat sink 51. The negative-polarity heat sink 51 is electrically connected to the rear bracket 8 via an electric conductor (unillustrated). The positive-polarity heat sink 50 and the negative-polarity heat sink 51 refrigerate the switching elements 26 and 27, respectively, that are fixed thereto, and are utilized as current paths, as described later.

An electric conductor 52 is provided at a position that is more distal from the rear bracket 8 than the heat sinks 50 and 51. The electric conductor 52 electrically connects the negative-polarity side of the switching element 26 with the positive-polarity side of the switching element 27 and is provided with the terminal 33 that is connected with the W-phase terminal 93 of the stator winding 9. Additionally, a control terminal 267 that is connected to the control circuit unit 3 is provided in the electric conductor 52; the control signal from the control circuit unit 3 is supplied to the gates of the switching elements 26 and 27 via the control terminal 267. The electric conductor 52 illustrated in FIG. 2 forms the wiring lead 32 illustrated in FIG. 3. The terminal 33 in FIG. 2 corresponds to the terminal 33 illustrated in FIG. 3.

The positive-polarity heat sinks 47, 43, and 50 of the switching elements 19, 20, and 21, respectively, are electrically connected with one another, and connected with the battery terminal 39 that is connected with the positive-polarity electrode of the vehicle battery 18. Accordingly, the respective positive-polarity sides of all of the switching elements 22, 24, and 26 that form the positive-polarity arms for the respective phases are connected with the positive-polarity electrode of the battery 18, via the respective positive-polarity heat sinks 47, 43, and 50, the battery terminal 39, and the harness 391. The positive-polarity heat sinks 47, 43, and 50 form as a whole the wiring lead 34 illustrated in FIG. 3.

In contrast, the negative-polarity heat sinks 48, 44, and 51 of the switching elements 19, 20, and 21, respectively, are electrically connected with the rear bracket 8, and connected with the negative-polarity electrode of the vehicle battery 18 via the rear bracket 8. Accordingly, the respective negative-polarity sides of all of the switching elements 23, 25, and 27 that form the negative-polarity arms for the respective phases are connected with the negative-polarity electrode of the battery 18, via the rear bracket 8 and the respective negative-polarity heat sinks 48, 44, and 51. The negative-polarity heat sinks 48, 44, and 51 form as a whole the wiring lead 38 illustrated in FIG. 3.

As illustrated in FIG. 2, the switching circuit units 19, 20, and 21, for the respective phases, that configure the power unit 2 are incorporated in the periphery of the rear bracket 8 and compactly arranged in such a way as to surround the rotation sensor 5.

Next, the configuration of the magnetic-field current control circuit unit 4 will be explained. In FIGS. 1 and 2, the magnetic-field current control circuit unit 4 includes, in its case 53, the magnetic-field switching element 41 for controlling the magnetic-field current in the rotor winding 11, the smoothing capacitor 40 illustrated in FIG. 3, and the reverse-current prevention diode 42. The output terminal of the magnetic-field current control circuit unit 4 is connected to the rotor winding 11, via a pair of brushes 151 and 152 held by a brush holder 15 and a pair of slip rings.

The positive-polarity side of the magnetic-field switching element 41 provided in the magnetic-field current control circuit unit 4 is connected with the positive-polarity electrode of the battery 18, via the battery terminal 39, the brush, the slip ring, and the rotor winding 11; the negative-polarity side of the magnetic-field switching element 41 is connected with the ground via the rear bracket 8.

The magnetic-field current control circuit unit 4 is disposed at a predetermined position, which are different from the respective positions where the switching circuit units 19, 20, and 21 for the respective phases are arranged, in such a way as to occupy part of the region of the rear bracket 8. Because, as described above, the power unit 2 and the magnetic-field current control circuit unit 4 are arranged in a distribution manner along the circumference of the rotating electric machine unit 1, these units can be mounted on the rotating electric machine unit 1 compactly in terms of a space.

In other words, the power unit 2 is disposed in a U-shaped manner on the rear bracket 8 in such a way as to surround the rotation sensor unit 5; the brush holder 15 for supplying the rotor winding 11 with an electric current is disposed at a position, on the rear bracket, which corresponds to the opening of the U shape formed by power unit 2; the magnetic-field current control circuit unit 4 that is electrically connected with the brushes 151 and 152 is disposed above the brush holder 15. As a result, the power unit 2, the brush holder 15, and the magnetic-field current control circuit unit 4 which is a main circuit unit are encircled by the side face of the rear bracket 8; therefore, a compact structure is realized.

As illustrated in FIG. 3, the control circuit unit 3 is disposed more outward than the power unit 2, the magnetic-field current control circuit unit 4, and the rotation sensor unit 5. The control circuit unit 3 is provided with a control-circuit-unit case 301, made of an insulator, which fits with the peripheral portion of the ring-shaped member 57 that is provided on the peripheral portion of the rotation sensor unit 5 and described later; in the control-circuit-unit case 301, there are provided the switching elements 22 to 27 of the power unit 2 and a control circuit board 302 that generates and outputs a control signal to be given to the gate of the magnetic-field switching element 41 in the magnetic-field current control circuit unit 4. The control-circuit-unit case 301 is configured in such a way as to cover the power unit 2 and the magnetic-field current control circuit unit 4.

Next, the rotation sensor unit 5 will be explained. IN FIGS. 1 and 2, the rotation sensor unit 5 is disposed in the vicinity of the end portion, of the rotor shaft 12, which is opposite to the load with respect to the rotor shaft 12. The rotation sensor unit 5 according to Embodiment 1 of the present invention includes a sensor rotor 54 that is adhered to the rotor shaft 12 and rotates along with the rotor shaft 12; a sensor stator 55 having an inner surface that faces the outer surface of the sensor rotor 54, by the intermediary of a gap; and a sensor winding unit 56 consisting of an excitation winding that is wound around the sensor stator 55 and generates a magnetic field and a detection winding for detecting a magnetic-field change. The rotation sensor unit 4 is disposed in the middle of the rotating electric machine unit 1 in such a way as to be surrounded by the power unit 2 and the magnetic-field current control circuit unit 4.

The sensor winding unit 56 consisting of the excitation winding and the detection winding is connected with the control circuit unit 3; the control circuit unit 3 applies an AC voltage, which serves as a reference for detecting the rotation position of the rotor in the rotating electric machine unit 1, to the excitation winding, so that an AC magnetic field is generated. The sensor rotor 54 has a petal shape in which portions having a radius different from that of the remaining portion are continuously and recurrently formed along the circumference thereof; a magnetic field, which changes in response to the rotation of the sensor rotor 54, is formed between the sensor rotor 54 and the sensor stator 55; an output voltage corresponding to the change in the magnetic field is generated across the detection winding of the sensor winding unit 56. Because, as described above, the magnetic field that are interlinked with the detection winding in response to the rotation operation of the sensor rotor 54 changes, the output voltage generated by the detection winding changes in response to the rotation operation of the sensor rotor 54; thus, the rotation position, i.e., the rotation angle of the rotating electric machine unit 1 can be detected.

Figure 5:
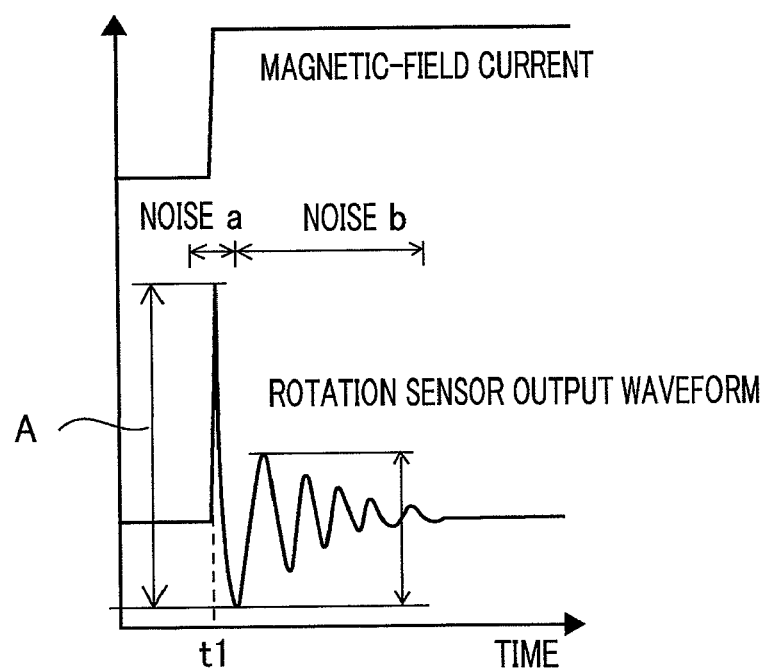
FIG. 5 is an explanatory graph representing an example of the waveform of noise superimposed in the output of a rotation sensor unit 5.

As is well known, at the beginning stage where the switching elements 22 to 27 of the power unit 2 start to operate and then the current sharply changes, noise caused by the sharp change in the current may be superimposed in the output of the rotation sensor unit 5. FIG. 5 is an explanatory graph representing an example of the waveform of noise superimposed in the output of the rotation sensor unit 5. As represented in FIG. 5, when, due to the switching operation of the magnetic-field switching element 41, the magnetic-field current sharply changes at a time instant t1, a change in the magnetic field occurs in a direction where the sharp change in the current is suppressed; thus, high-frequency noise a having a peak width of A is produced in the output of the detection winding in the rotation sensor unit 5 in a time period from the time instant t1 to a time instant in the vicinity of the time instant t1. After that, following the noise a, there is produced oscillating noise b that is based on the current path consisting of the magnetic-field switching element 41 and the capacitor 40 and has a relatively low frequency. In addition, although not illustrated, the switching operation of the switching elements 22 to 27 in the power unit 2 also causes noise.

The fact that the switching operation of the switching elements 22 to 27 in the power unit 2 causes noise is worried as a problem inherent to the structure in which the power unit 2 and the magnetic-field current control circuit unit 4 that control the respective currents that flow in the stator winding 9 of the rotating electric machine unit 1 and the rotor winding 11, respectively, are arranged in the vicinity of the rotation sensor unit 5, and the power unit 2, the magnetic-field current control circuit unit 4, and the rotation sensor unit 5 are mounted in an integrated manner in the rotating electric machine unit 1.

In the rotating electric machine according to Embodiment 1 of the present invention, the ring-shaped member 57 consisting of a non-magnetic unit 571 and a magnetic unit 572 each formed in a cylindrical shape is provided in the peripheral portion of the rotation sensor unit 5 so that the foregoing noise is eliminated or reduced.

Figure 4:
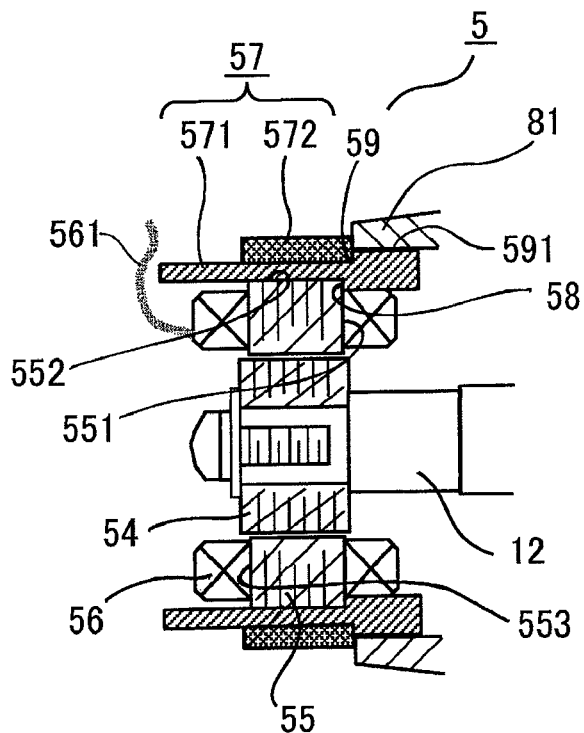
FIG. 4 is an enlarged schematic cross-sectional view of the rotation sensor unit in a rotating electric machine according to Embodiment 1 of the present invention.

FIG. 4 is a schematic cross-sectional view illustrating the rotation sensor unit 5 in an enlarged manner. As illustrated in FIG. 4, the ring-shaped member 57 is provided outside the sensor stator 55 of the rotation sensor unit 5. The ring-shaped member 57 is configured with the non-magnetic unit 571 formed in a cylindrical shape and the magnetic unit 572 formed in a cylindrical shape and disposed along the circumferential surface of the non-magnetic unit 571, and mounted in such a way as to surround the circumference of the rotation sensor unit 5, i.e., in such a way as to close the periphery of the rotation sensor unit 5 along the circumference thereof.

The cylindrical non-magnetic unit 571 has level-difference portions 58 and 59 formed in the inner surface and the outer surface thereof. The outer surface of one end, in the axis direction, of the iron core of the sensor stator 55 is inserted into the inner surface of the non-magnetic unit 571, and an end surface 551, in the axis direction, of the iron core is fixed on the level-difference portion 58 of the non-magnetic unit 571. By being configured in such a way as described above, the iron core of the sensor stator 55 is fixed positioned in such a way as to be coaxial with the non-magnetic unit 571 and the magnetic unit 572.

Moreover, the non-magnetic unit 571, which makes contact with the one end 551, in the axis direction, of the iron core of the sensor stator 55 and the circumferential surface 552 of the iron core, serves as an electromagnetic shield that takes advantage of an eddy current; therefore, the magnetic flux that penetrates the sensor stator 55 decreases, whereby the foregoing noise can be reduced.

A large diameter portion 591 in which the level-difference portion 59 in the outer surface of the non-magnetic unit 571 is formed is inserted into the inner portion of a protrusive fixation portion 81 of the rear bracket 8 so that the non-magnetic unit 571 is fixed to the protrusive fixation portion 81 of the rear bracket 8. The magnetic unit 572 is fixed inserted into the outer surface of the non-magnetic unit 571, and the one end, in the axis direction, of the magnetic unit 572 makes contact with the level-difference portion 59 of the non-magnetic unit 571 and one end, in the axis direction, of the protrusive fixation portion 81 of the rear bracket 8.

The protrusive fixation portion 81 is positioned in such a way as to be coaxial with the portion, of the rear bracket, in which the bearing 14 is fixed, and fixed to the rear bracket 8. Accordingly, by accurately machining the level-difference portions 58 and 59 formed in the inner surface and the outer surface of the non-magnetic unit 571 included in the ring-shaped member 57, the level of being coaxial, of the rotation sensor unit 5, with the rotor shaft 12 can be ensured. Because the accuracy of the shapes of the level-difference portions 58 and 59 of the non-magnetic unit 571 included in the ring-shaped member 57 can be ensured relatively readily through molding, machining, or the like, the level of being coaxial of the rotation sensor unit 5 with respect to the rotor shaft 12 can readily be ensured; thus, the industrial level of the foregoing configuration is high.

The ring-shaped member 57 consisting of the non-magnetic unit 571 and the magnetic unit 572 serves as an electromagnetic shield that takes advantage of the occurrence of an eddy current and a magnetic flux bypassing shield that takes advantage of a low magnetic resistance, in order to cope with a change in the magnetic field due to a sharp change of the current in the switching element.

Figure 6:
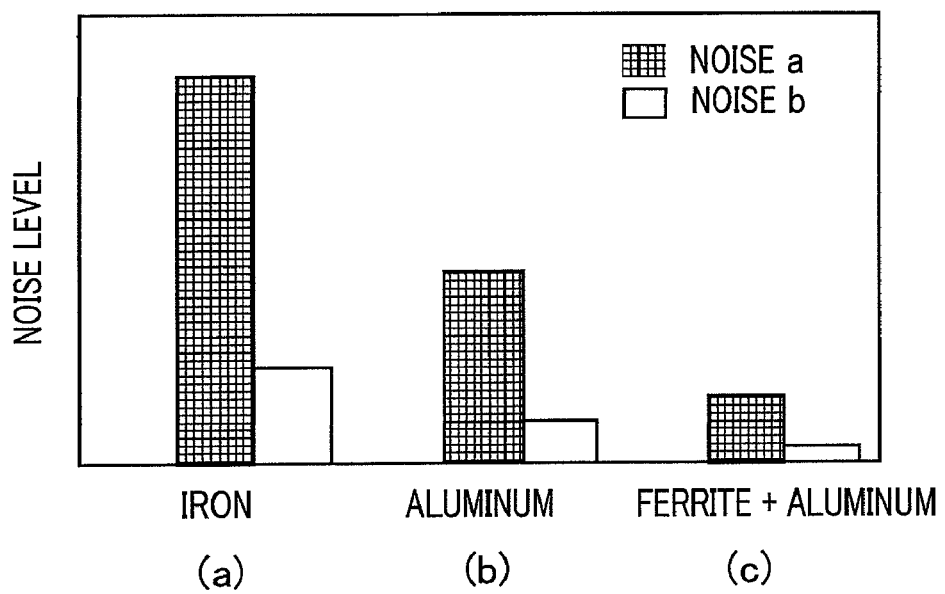
FIG. 6 is a graph representing the result of measurement of the level of noise superimposed in the output of a rotation sensor unit in the case where a ring-shaped member is mounted.

FIG. 6 is a graph representing the result of measurement of the level of noise superimposed in the output of the rotation sensor unit 5 in the case where the ring-shaped member 57 is mounted. In FIG. 6, part (a) represents noise levels in the case where, as a shield, an iron member, which is a magnetic material, is provided as a ring-shaped member; part (b) represents noise levels in the case where, as a shield, only a non-magnetic unit made of aluminum is provided as a ring-shaped member; and part (c) represents noise levels in the case where, as a shield, a magnetic material made of ferrite and aluminum is provided as a ring-shaped member. The black bar and the white bar in each of parts (a), (b), and (c) represent noise a and noise b, respectively, represented in FIG. 5.

In FIG. 6, in the case where an iron-made ring-shaped member is mounted (part (a)), the overall noise level is reduced to approximately half of the noise level in the case where the ring-shaped member 57 is not provided. In contrast, in the case where only a non-magnetic unit made of aluminum is provided (part (b)), the noise level is reduced further by half; in the case where a non-magnetic unit with a magnetic material added thereto is provided (part (c)), the noise level is reduced to one-tenth of the original noise level or lower. Therefore, it is obvious that the rotating electric machine, according to Embodiment 1 of the present invention, in which the ring-shaped member 57 consisting of the non-magnetic unit 571 and the magnetic unit 572 is provided along the circumference of the rotation sensor unit 5 demonstrates an remarkable effect on the reduction of noise in the rotation sensor unit 5.

By forming the non-magnetic unit 571 with aluminum or copper as a principal component, there can be provided a high-reliability positioning mechanism for the rotation sensor unit 5 or a holding mechanism for the magnetic unit 572 that not only has a high conductivity so as to be able to demonstrate an excellent electromagnetic shield effect but also is readily machined and mechanically strong, compared with a magnetic material made of ferrite, as a principal component, having a great advantage in magnetic shielding.

By forming the non-magnetic unit 571 with aluminum or copper as a principal component, the heat conductivity becomes high, the temperature increase due to the occurrence of an eddy current is reduced, and the heat radiation performance of the rotation sensor unit 5 can be raised; thus, the accuracy of detection by the rotation sensor unit 5 can be enhanced.

As illustrated in FIG. 4, the magnetic unit 572 is provided along the outer surface of the non-magnetic unit 571. The non-magnetic unit 571 has a shape that is longer than at least the sensor winding unit 56 of the rotation sensor unit 5, in the longitudinal direction of the rotation sensor unit 5; the magnetic unit 572 of the ring-shaped member 57 is formed in such a way as to extend, along the rotor shaft 12, longer than one axis-direction end 551 of the iron core of the sensor stator 55 in the rotation sensor unit 5. On the other hand, the magnetic unit 572 is formed in such a way as to extend, along the rotor shaft 12, longer than the other axis-direction end of the iron core of the sensor stator 55. By forming the magnetic unit 572 in such a way as described above, the magnetic flux that flows into the iron core of the sensor stator 55 is cut off by the magnetic unit 572 of the ring-shaped member 57; therefore, noise that is superimposed in the detection winding included in the sensor winding unit 56 can effectively be reduced. In addition, a winding end portion 561 of the sensor winding unit 56 is pulled out along the non-magnetic unit 571.

By providing the magnetic unit 572 along the outer surface of the rotation sensor unit 5, the action and effect of the magnetic unit 572 as a magnetic shield are enhanced. In other words, due to the low magnetic resistance of the magnetic unit 572, magnetic flux that is produced upon the switching operation of the switching element selectively flows into the magnetic unit 572, whereby a high-magnitude magnetic field is formed in the vicinity of the magnetic unit 572. Accordingly, the closer to the switching element that cause magnetic flux is the magnetic unit 572 is situated, the smaller becomes the region, in the vicinity of the switching element, within which the magnetic flux spreads; therefore, the noise shielding effect can further be raised.

Embodiment 2

Figure 7:
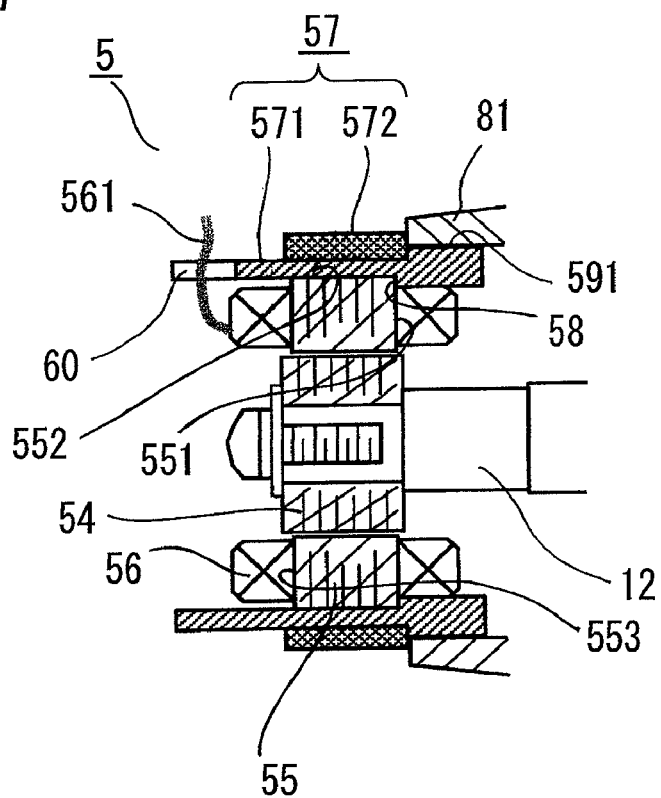
FIG. 7 is an enlarged schematic cross-sectional view of the rotation sensor unit in a rotating electric machine according to Embodiment 2 of the present invention.

FIG. 7 is an enlarged schematic cross-sectional view of the rotation sensor unit in a rotating electric machine according to Embodiment 2 of the present invention. In FIG. 7, a rotation sensor unit 5 is provided with a sensor winding unit 56 having an excitation winding and a detection winding; the excitation winding and the detection winding of the sensor winding unit 56 are connected with a control circuit unit 3. In other words, the winding end portion is connected with the connection terminal of the control circuit unit 3.

In the rotating electric machine according to Embodiment 2, a notched portion 60 is provided in part of a non-magnetic unit 571 in a ring-shaped member 57, and the winding end portion 561 is pulled out through the notched portion 60 and connected with the control circuit unit 3. A magnetic unit 572 is formed along the axis direction in such a way as not to overlap the notched portion 60 of the non-magnetic unit 571 and to surround the whole circumference of the rotation sensor unit 5 with its area extending along the axis direction. By configuring the rotation sensor unit 5 in such a way as described above, a change in magnetic flux due to the switching operation of the switching element does not intrude in the rotation sensor unit 5 through the notched portion 60; thus, an excellent shielding effect can be demonstrated.

Moreover, as is the case with Embodiment 1, the non-magnetic unit 571 of the ring-shaped member 57 has a shape that is longer than at least the rotation sensor unit 5, in the longitudinal direction of the rotation sensor unit 5; the magnetic unit 572 is formed in such a way as to extend, along the rotor shaft 12, longer than the other axis-direction end 553 of the iron core of the sensor stator 55 in the rotation sensor unit 5. As a result, the winding end portion 561 can be pulled out without the shielding effect being reduced by the formation of the notched portion 60.

Embodiment 3

Figure 8:
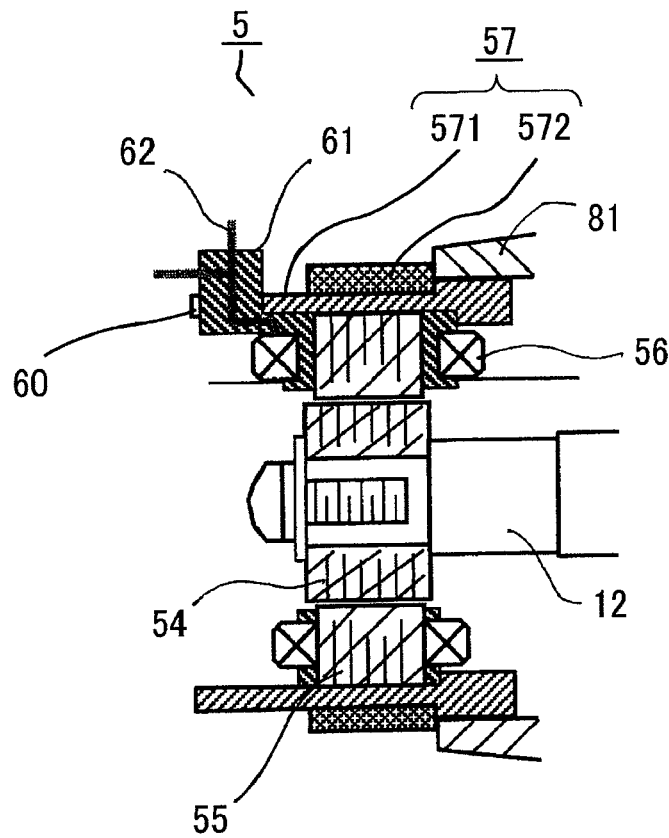
FIG. 8 is an enlarged schematic cross-sectional view of the rotation sensor unit in a rotating electric machine according to Embodiment 3 of the present invention.

FIG. 8 is an enlarged schematic cross-sectional view of the rotation sensor unit in a rotating electric machine according to Embodiment 3 of the present invention. In FIG. 8, a winding end portion 561 of a sensor winding unit 56 in a rotation sensor unit 5 is preliminarily connected with a terminal member 62 molded in an insulative resin member 61. The resin member 61 is fixed inserted into a notched portion 60 in a non-magnetic unit 571 and is provided with a portion that protrudes from the notched portion 60 to the outside of the outer surface of the non-magnetic unit 571; the terminal member 62 is pulled out from the protrusion portion of the resin member 61 to the outside of the rotation sensor unit 5.

Because the resin member 61 is fixed inserted into the notched portion 60 in the non-magnetic unit 571, the position of the terminal member 62 is fixed with respect to the position of the ring-shaped member 57; therefore, it is prevented that variations in the position of the winding end portion of the sensor winding unit 56 affect the output, whereby the detection accuracy is enhanced. Moreover, because the winding end portion can accurately and mechanically be held by the non-magnetic unit 571 in the ring-shaped member 57, high-reliability wiring can be realized even in the case where vibration environment is severe.

In the case where the terminal member 62 is molded with the resin member 61, the ring-shaped member 57 may also be molded in an integrated manner; furthermore, the iron core of a sensor stator 55 may also be molded in an integrated manner. Moreover, the molding may be performed, for example, by mixing powder of insulative magnetic material with the resin material for the resin member 61; in this case, the shielding effect can further be raised.

Embodiment 4

Figure 9:
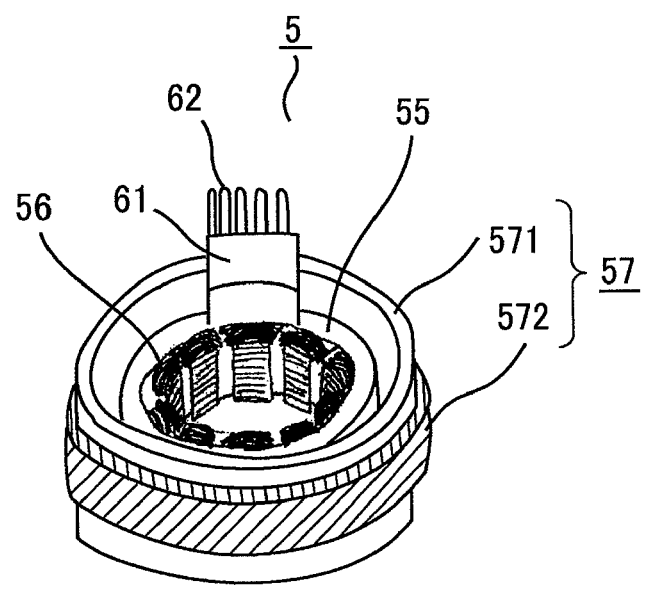
FIG. 9 is a perspective view of a rotation sensor assembly in a rotating electric machine according to Embodiment 4 of the present invention.

FIG. 9 is a perspective view of a rotation sensor assembly in a rotating electric machine according to Embodiment 4 of the present invention. In Embodiment 4, as illustrated in FIG. 9, there is preliminarily produced a rotation sensor assembly 500 in which a ring-shaped member 57 consisting of a non-magnetic unit 571 and a magnetic unit 572, an iron core of a sensor stator 55 of a rotation sensor 5, a sensor winding 56 are integrated. Other configurations are the same as those in each of Embodiments 1 to 3.

Firstly, the sensor winding unit 56 is wound around the iron core of the sensor stator 55. Next, the sensor stator 55 is fixed in such a way that the iron core integrated with the sensor winding unit 56 that is wound around the iron core is positioned in the ring-shaped member 57. In this regard, the sensor stator 55 is fixed, for example, in accordance with a method in which the sensor stator 55 is pressed and inserted into the non-magnetic unit 571, or a method in which the inner diameter of the non-magnetic unit 571 is made slightly larger than the outer diameter of the sensor stator 55 and the inner surface of the non-magnetic unit 571 and the outer face of the sensor stator 55 are bonded with an adhesive.

By producing the rotation sensor assembly 500 in such a way as described above, the sensor stator 55 is fixed to the independent ring-shaped member 57; therefore, in the fixation of the sensor stator 55, the ring-shaped member 57 can readily be held, whereby the iron core of the sensor stator 55 and the ring-shaped member 57 can be fixed to each other with high accuracy.

In addition, in the rotation sensor assembly 500 produced in such a way as described above, as is the case with Embodiment 3, the winding end portion of the sensor winding unit 56 is preliminarily connected with a terminal member 62 molded in an insulative resin member 61. The resin member 61 is fixed inserted into a notched portion 60 in the non-magnetic unit 571 and is provided with a portion that protrudes from the notched portion 60 to the outside of the outer surface of the non-magnetic unit 571; the terminal member 62 is pulled out from the protrusion portion of the resin member 61 to the outside of the rotation sensor unit 5.

In general, the rotation sensor unit 5 has various kinds of shapes, depending on a plant such as a vehicle in which the rotating electric machine 100 is mounted, or on a type among a great number of product types. The non-magnetic unit 571, of the ring-shaped member 57, in a state of the rotation sensor assembly 500 is machined in such a way that the shape of a portion, of the non-magnetic unit 571, which is inserted into the rotating electric machine unit 1, or the level-difference contour of the non-magnetic unit 571 conforms to a production type, so that various kinds of rotation sensor assemblies can be produced from the same rotation sensor assemblies 500.

In particular, for example, due to the effect of the decentering of the rotor shaft 12, the positioning between the iron core of the sensor stator 55 and the rotor shaft 12 supported on the rear bracket 8 by the intermediary of the bearing 14 or the like may not accurately be performed; in this case, the accuracy of rotation-position detection by the rotation sensor unit 5 may be deteriorated. In contrast, according to Embodiment 4 of the present invention, after the production of the rotation sensor assembly 500 in which the iron core of the sensor stator 55 is integrated, the level-difference portion 59 formed in the outer surface of the non-magnetic unit 571 is machined so that centering can be performed; therefore, the accuracy of the positioning between the iron core of the sensor stator 55 and the rotor shaft 12 is raised, whereby the accuracy of detection by the rotor sensor unit 5 is enhanced. In such a way as described above, the centering position is adjusted through post machining even in the case where the ring-shaped member 57 is fixed with a low stress to the iron core of the sensor stator 55, by bonding with an adhesive the iron core of the sensor stator 55 and the ring-shaped member 57 so as to fix them to each other; thus, the accuracy of positioning between the iron core of the sensor stator 55 and the rotor shaft 12 can be maintained.

Various modifications and alterations of this invention will be apparent to those skilled in the art without departing from the scope and spirit of this invention, and it should be understood that this is not limited to the illustrative embodiments set forth herein.

What is claimed is:
1. A rotating electric machine comprising:
a power unit provided with a switching element that controls an electric current that flows in a stator winding provided in a stator;

a magnetic-field current control circuit unit provided with a switching element that controls an electric current that flows in a rotor winding provided in a rotor; and a rotation sensor unit comprising:

a sensor rotor fixed on a rotor shaft that supports the rotor;

a sensor stator that faces the sensor rotor by the intermediary of a gap; and a sensor winding provided on the sensor stator, the rotation sensor unit outputting from the sensor winding an output in accordance with a rotation position of the sensor rotor, wherein the power unit and the magnetic-field current control circuit unit are arranged on a predetermined surface of one of a pair of brackets that pivotably support the rotor shaft, and the rotation sensor unit is disposed in the vicinity of the predetermined surface of the one bracket; and wherein there is provided a ring-shaped member that is fixed on the outer surface of the sensor stator and configured with a non-magnetic unit having an electric conductivity and a magnetic unit.

2. The rotating electric machine according to claim 1, wherein the magnetic unit included in the ring-shaped member is formed of a material composed mainly of ferrite.

3. The rotating electric machine according to claim 1, wherein the non-magnetic unit included in the ring-shaped member is provided with a notched portion for pulling out a terminal member connected with a winding end portion of the sensor winding; and wherein the magnetic unit included in the ring-shaped member has an axis-direction length that is always the same over the whole circumference thereof, and is provided in such a way as to cover the whole circumference of the rotation sensor unit.

4. The rotating electric machine according to claim 3, wherein the terminal member is molded with a resin member that is inserted into the notched portion in the non-magnetic unit.

5. The rotating electric machine according to claim 3, wherein the magnetic unit included in the ring-shaped member is held in the non-magnetic unit in such a way as to extend, along the rotor shaft, longer than at least the sensor stator; and wherein the non-magnetic unit is provided in such a way as to extend, along the rotor shaft, longer than at least the sensor winding.

6. The rotating electric machine according to claim 3, wherein the magnetic unit is disposed outside the circumferential periphery of the non-magnetic unit.

7. A production method for a rotating electric machine according to claim 1, wherein, after the rotation sensor unit and the ring-shaped member are preliminarily fixed to each other, the rotation sensor unit is provided in the rotating electric machine.

* * * * *